Jan. 22, 1952    F. W. DUNMORE    2,582,971
PULSE ECHO DISTANCE AND DIRECTION FINDING
Filed Nov. 10, 1939    2 SHEETS—SHEET 1

Francis W Dunmore
INVENTOR

BY
ATTORNEY

Jan. 22, 1952  F. W. DUNMORE  2,582,971
PULSE ECHO DISTANCE AND DIRECTION FINDING
Filed Nov. 10, 1939  2 SHEETS—SHEET 2
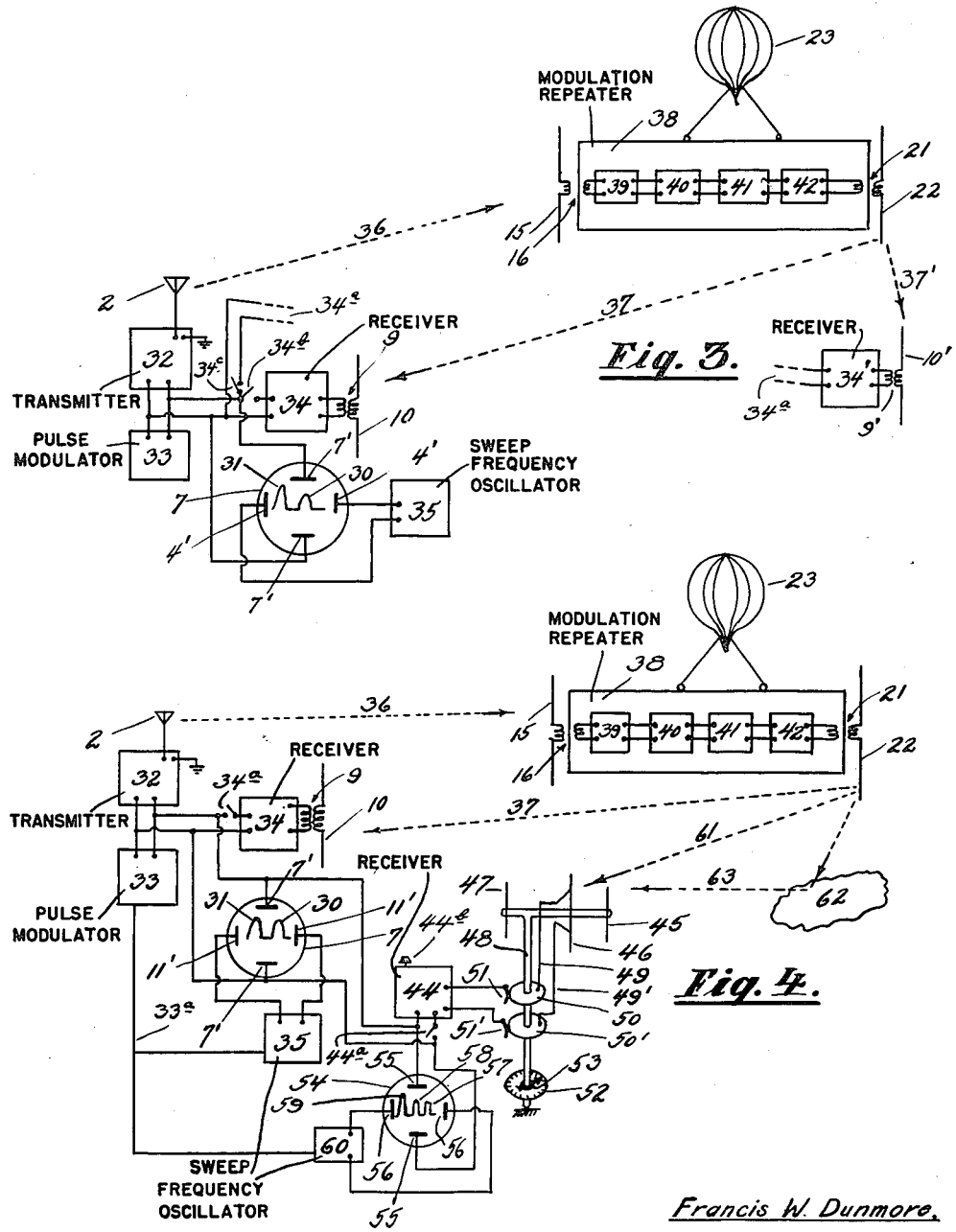
Francis W. Dunmore,
INVENTOR Patented Jan. 22, 1952

2,582,971

UNITED STATES PATENT OFFICE 2,582,971

PULSE ECHO DISTANCE AND DIRECTION FINDING

Francis W. Dunmore, Washington, D. C., assignor to the United States of America as represented by the Secretary of Commerce Application November 10, 1939, Serial No. 303,798

13 Claims. (Cl. 343—11)

(Granted under the act of March 3, 1883, as amended April 30, 1928; 370 O. G. 757)

The invention herein described may be made or used by or for the Government of the United States without the payment of any royalty thereon or therefor.

This invention relates to the determination of a location of an ambulant object by radio and aims generally to improve this art. The invention, among other things, enables location of a mobile object, either as regards its distance from one or more points, its direction from one or more points, or both.

The invention is particularly, but not exclusively, applicable in conjunction with the radio sonde whereby the position of a balloon carrying a radio sonde, or radiometerograph, may be determined at all times. This is a valuable application of the invention as the geographic position at which the temperature and humidity and other meterological factors are being measured by the radio sonde constitutes desirable knowledge in the art of radiometeorography.

Heretofore it has been necessary to take cross bearings with the radio direction finder in order to determine the distance to the radio sonde. This method is inaccurate and difficult as the ultra-high radio-frequency signals from the radio sonde give wrong indications of direction as they are refracted, reflected and diffracted by abrupt changes in the density of the air due to marked changes in its humidity. Such errors in two or more bearings, when used to obtain a position indication, result in marked errors in determining the distance to or geographic location of the mobile object.

One object of my invention is therefore to provide for locating a mobile object, without entire reliance on azimuthal direction finding at two or more widely separated points, by measuring the distance directly, by the time required for a signal to go to the mobile object and be re-transmitted back to the starting point. This accurate determination of distance, combined with an azimuthal bearing taken preferably from the point of origin of the distance determination signal, serves to give a geographic location of the mobile object with much greater accuracy than heretofore, when cross bearings were employed. There are also many advantages of determining the geographic location of a mobile object from a single station as no communication between widely separated points is necessary when making a measurement as is the case when cross bearings are taken. It is understood, however, that my method is applicable in many combinations, and may be applied without resort to direction finding at all, if distance determinations are made from two separated points.

Briefly this novel method of distance finding and position determination involves the transmission of a radio-frequency carrier wave to a mobile object. This carrier wave may be modulated in various ways, as by a suitable modulation frequency or by interruption at a suitable pulse rate. This carrier wave is received by a receiving means on the mobile object, amplified, and applied to modulate an ultra-high radio-frequency transmitter on the mobile object operating at a distinguishable carrier frequency compared to that of the original modulated carrier wave. (This may be the radio-meteorograph transmitter in the case of its use in radiometeorography). This modulated ultra-high radio-frequency signal from the mobile object (segregable from the original modulated carrier wave due to its distinguishable carrier frequency) is again received at, at least, one ground station, preferably located at the point of origin of the original signal. The modulation is detected and applied to an oscillograph along with some of the ordinal modulation frequency or pulse. From the figure or spacing of figures thus produced, the distance and functions of the distance such as rate of lateral motion of the mobile object may be determined. Such determinations at two separate points make possible the determination of the position of the mobile object, or such a determination of distance together with an azimuthal bearing, preferably taken at the same station, makes it possible to determine the position of the mobile object.

Other and further objects of my invention will be apparent from the following detailed description and accompanying drawings. It is expressly understood, however, that these drawings are for the purpose of illustration only and not desinged for a definition of the limits of my invention. Referring to the illustrations—

Fig. 3 shows a combination in which the signal transmitted to the balloon is broken into pulses.

Fig. 4 shows a combination using the pulse transmission of Fig. 3 with the addition of auxiliary direction finding means.

Figure 1:
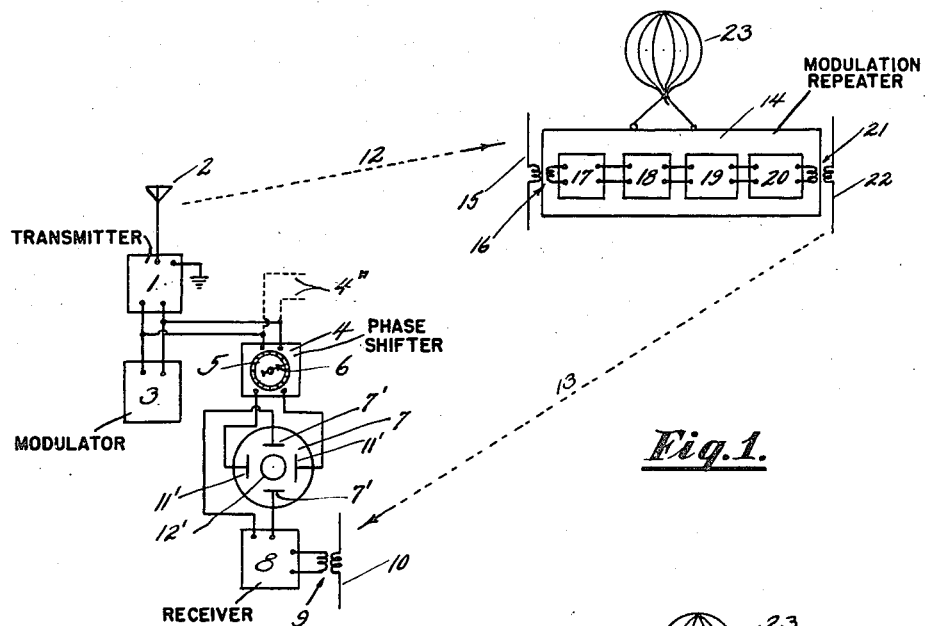
Fig. 1 shows a combination in which the signal transmitted to the mobile object is modulated by a sinusoidal wave.

Referring more in detail to the illustrative embodiments represented in the drawings, the embodiment shown in Fig. 1 comprises a radio transmitter 1 which may operate at any convenient high-frequency such, for example, as 15 megacycles, and which is provided with a radiating antenna 2, and with a modulator 3 which may operate to modulate the transmitter signal at any desirable frequency or band of frequencies preferably from 10 to 20 kc. The higher the frequency of the modulator 3, the more sensitive the distance determination indications become. A part of the output of modulator 3 in the form shown, is passed through a phase shifter 4 with indicator 6 and scale 5 calibrated in angle of phase shift. The output of shifted phase is connected from phase shifter 4 to the horizontal plates 11' of oscillograph 7. By means of phase shifter 4, therefore, the phase of the voltage delivered to these plates may be shifted through known angles.

The vertical plates 7' of the oscillograph 7 in the form shown are connected to the output of an ultra high frequency receiver 8, coupled through coil 9 to receiving antenna 10.

The modulated wave 12 radiated from antenna 2 is received by the mobile receiving antenna 15, carried by the mobile object 14, which in the form shown is rendered ambulant by balloon 23, and may be termed an ambulant or repeater station. In the form shown the mobile receiving antenna 15 tuned to the radio frequency of the transmitter 1, is coupled by coupling coils 16 to the radio-frequency amplifier 17 for the radio frequency of transmitter 1, thence to a detector 18, an amplifier 19 for the frequency or band of frequencies impressed on transmitter 1 by modulator 3, and thence to ultra high radio frequency oscillator 20 which is modulated by the output of amplifier 19 and the output of which is coupled through coil 21 to the mobile radiating antenna 22. Oscillator 20 may operate on any convenient ultra high radio frequency, say, for example, 65 megacycles. The modulated radiated wave 13 from mobile antenna 22 is received by antenna 10 and receiver 8 (preferably located, as shown, at the signal originating station) and the output of receiver 8 (which consists of the original modulation impressed on transmitter 1 by modulator 3) is applied to the vertical plates 7' of oscillograph 7.

With this arrangement, if the modulation carried by carrier 13 is 90° out of phase with the original modulation supplied by modulator 3 through phase shift indicator 4 to plates 11', then a circle will be observed at 12'. If they are in phase a straight line sloping 45° will be observed, and if out of phase by 180° then the 45° slope will be in the opposite direction. By operating phase shift member 4 so that the figure 12' is held in definite form, say, a circle, the difference in phase of the modulation on carrier 13 and the original modulation supplied by modulator 3 can be continuously measured.

Knowing the phase relationship for one known relative position of the two stations (as the phase relation at the moment the mobile radio-sonde is released, for example) and knowing the frequency of modulator 3 and the velocity of wave propagation, 186,000 miles per second, then the total shift of phase in any elapsed period of time is a direct indication of the amount by which the radial distance between the two stations has changed in that period of time, and determines the total radial distance therebetween. Or, otherwise expressed, knowing the phase shift per unit of time, the frequency of modulator 3, and the velocity of propagation of radio waves 186,000 miles per second, the radial speed of the mobile object is easily determined, and knowing each increment of radial speed from the time of takeoff, the radial distance to the mobile object is known at each instant. A graphical record against time may be made of the position of pointer 6 as moved to hold a circle at 12' from which each increment of speed may be read off and added up to give distance at any instant. If desired this may be done automatically by means known to the art so that the radial distance to the balloon at any instant may be read from a graph.

As as example of the determination of distance by the above embodiment of the invention, assuming the modulation frequency of modulator 3 is set at, say 10,000 cycles per second, then 1 cycle of the 10,000 cycles (or 360° of phase shift) is equivalent to $1/10{,}000$ of 186,000 miles per second (velocity of radio waves) which amounts to 18.6 miles. As the signal must go to the mobile object 14 and return, the corresponding one-way distance would amount to 9.3 miles. Now, if, as in the assumed case 360° equal 9.3 miles, then 1° of phase shift represents .0258 mile of one-way distance. Thus each degree of phase difference registered by phase shift meter 4 means the mobile object has moved radially by .0258 mile, or 136.4 feet. If a frequency of 2000 cycles per second is employed, then each 360° of phase shift represents 46.5 miles of one-way distance.

From these facts it will be apparent that great sensitivity to distance change can be obtained by this invention while guarding against loss of an increment of distance corresponding to a substantial change, as plus or minus one or more complete 360° phase shifts, which might be occasioned if reception of the corresponding very high modulation frequency were interrupted for a substantial period. This may be done by shifting periodically, as for a short interval once in every few minutes, from the principal and sensitive high frequency of modulation, to a secondary, low frequency of modulation, providing for following within a single complete cycle of phase shift, a much greater travel distance of the mobile object. With this arrangement any loss of the high frequency modulation over a period of time less than one complete cycle of phase shift of the low-frequency modulation may be caught up even if both signals are interrupted, and more, if the low frequency signal is not interrupted.

Furthermore, while I have illustrated my preferred arrangement comprising a goniometer means 4–7 for following and counting the cycles a phase shift, the broader aspects of the invention are not limited thereto, and the shifts of phase may be followed without use of the phase shifter 4 by counting the changes in the Lissajous curve from circular to linear and return to circular which occurs if the phase shifter 4 is left at a fixed setting or omitted.

As also indicated in Fig. 1, if it is desired to obtain distance indications at more than one point of reception to enable direction determination by triangulation, this may be accomplished in any of the forms of the invention shown, by setting up a duplicate of the receiver arrangement at another station of known location relative to the station at receiving point 10. The time reference may be obtained at this second receiving point by any suitable means, such, for example, as direct reception at the second receiving station of the signal from antenna 2, or reception of the modulation frequency thereat by transmission lines, such as indicated at 4", Fig. 1. With such an arrangement the receiver at the station of origin having determined the time for the signal to be transmitted, intercepted, retransmitted and received at that station, and the other having determined the time for the signal to be transmitted, intercepted, retransmitted and received at the second station, both for an initially known position of the ambulant station 14, the changed distances from the ambulant station 14 to each of the receiving stations may be determined as a basis for triangulation to locate the position of the ambulant station relative thereto.

My invention further contemplates that the position of the ambulant station may be determined by determining its distance from the station of origin, as above described, and determining its direction from one or more other receiving points of known position relative to the station of origin.

By this arrangement with one direction finding station, known elevation of the ambulant station (determinable by other means in the case of the radio sonde, or radiometeorograph) and known distance from a reference station (preferably the station of origin) the location in space of the ambulant station may be determined, and with two direction finding stations and the known distance from the reference station, the position of the ambulant station in space may be determined without independent information as to its elevation. It will be appreciated in this connection, that the receiver 8, 9, 10 of Fig. 1 may be a directional receiver as described in connection with Fig. 4 hereinafter.

Figure 2:
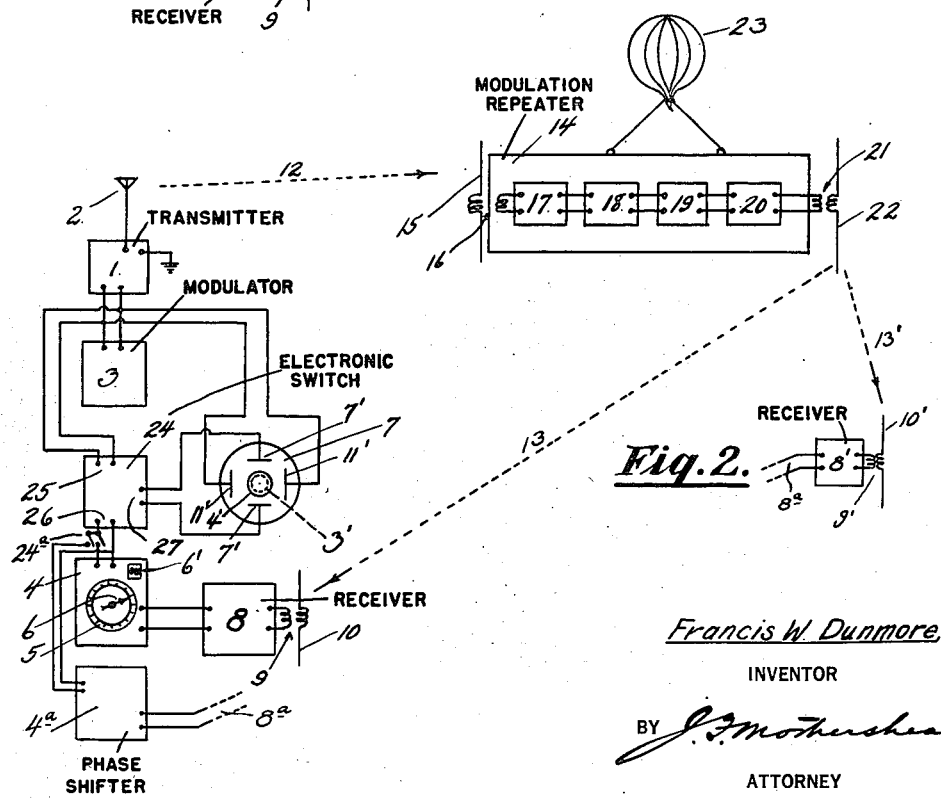
Fig. 2 shows a similar combination with the addition of an electronic switch so that two or more Lissajous figures may be superimposed, one figure forming a zero or reference.

Referring now to Fig. 2, the form there shown comprises a combination which operates essentially as that shown in Fig. 1, except that an electronic switch 24 is introduced to give a fixed reference circle on the oscillograph from which it is easier to see any drift in the circle produced by the incoming modulation from the mobile object. In this arrangement the elements 1, 2, 3 are the same as in Fig. 1, as are the elements on the mobile object 14. The receiver 8, coil 9 and antenna 10 are also the same, as is oscillograph 7. The phase shift meter 4 is the same but includes a comptometer 6' arranged to algebraically record the number of complete revolutions of the full-cycle phase indicator 6, and the phase shift meter 4 is connected to the output of receiver 8 so the phase of the received modulation delivered to terminals 26 of electronic switch 24 may be held equal to the phase of the voltage delivered to terminals 25 by the modulator 3, to the output of which said input terminals 25 of the electronic switch are also connected. The electronic switch may be of any suitable form, for example, of the type 150 made by Allen B. DuMont Laboratories, Upper Montclair, N. J. When the electronic switch connects terminals 25 to the output 27 and to vertical plates 7' then a circle 4' is formed since the same source is connected to both the horizontal and vertical plates of oscillograph 28. This circle provides a fixed reference from which the drift of the other figure 3' may be observed. Figure 3' is formed when the electronic switch operates to connect terminals 26 to 27 and plates 7', and is produced by the signal 13 received from the mobile object 14. Since the switching rate is very rapid the circle 4' and figure 3' are observed simultaneously.

There is also shown in Fig. 2 an arrangement whereby direction, as well as radial distance, may be determined by the triangulation data obtained by reception of the signal at two receiving stations. In the form shown control is centralized at the station of origin as is preferred.

In this instance a second receiving station is provided at a known distance from receiving stations 8, 9, 10, comprising parts 8', 9', and 10' which may be duplicates of parts 8, 9, 10. The output from this second receiver 8', 9', 10', is in the form shown connected by transmission line 8a to a second phase shifter 4a, similar to phase shifter 4, and phase shifter 4a is connected by lines 4b to electronic switch 24; a suitable switching means, shown as two single-pole single-throw switches 24a, being provided to enable either or both phased receiver outputs to be connected to the electronic switch 24 for supply to plates 7' of oscillograph 7. As the receiver 8, 9, 10 enables the determination of the distance 13 to be obtained as above explained, and as the time lag from receiver 8', 9', 10' to phase shifter 4a is known (or eliminated by the initial reading for a known position of the ambulant station) it is apparent that the distance 13' from the ambulant station to the second receiver 10', 9', 8', may be closely determined by closely following a reading on receiver 8, 9, 10 by a reading on receiver 8', 9', 10' and coordinating the two readings. The two distances 13 and 13' being determined, and the distance from receiver 8, 9, 10 to receiver 8', 9', 10' being known, the position of the ambulant station 14 may be determined by triangulation, and may be azimuthally determined by correction for the elevation of the ambulant station, which elevation may be determined in any suitable manner, as by an altitude indicating signal from a radiometeorograph carried by ambulant station 14. If desired, transmission line 8a may be replaced by a radio-link, interposed between receiver 8' and phase shifter 4a.

Furthermore, by the arrangement shown, by adjusting the output of phase shifters 4 and 4a to different amplitudes and closing both switches of switching means 24a, a Lissajous figure (not shown) which will be similar to the figure 3' but of different size, may be added to the visual indications of the oscillograph, and by keeping the three figures of the oscillograph concentric by manipulating phase shifters 4 and 4a the two distance determinations, one for each receiving point, may be concurrently found.

In the form shown in Fig. 3 pulse transmission takes the place of a steady modulation. The time taken for a pulse to go to the mobile object, be received, and reradiated, and received back at its source is a measure of the radial distance to the mobile object. The velocity of propagation of radio waves and the time constant of the receiver and transmitter on the mobile object being known, the time interval is readily measured by an oscillograph in accordance with this invention, preferably by attenuating the reference and received signal pulses along a time axis.

In the embodiment of Fig. 3, the radio transmitter 32 may operate at any convenient high radio frequency, for example, 15 megacycles, and is provided with a pulse modulator 33 so that the transmitter 32 radiates its carrier 36 in the form of very short pulses separated by suitable short time intervals. Antenna 2 radiates these pulses 36 into space where they are received at the mobile object 38 by antenna 15 tuned to the carrier frequency of transmitter 32. The pulse of carrier 36 passes from antenna 15 through coupling means shown as coils 16 to radio-frequency amplifier 39 tuned to the carrier frequency of transmitter 32, and thence to a detector 40 for rectifying the radio-frequency pulse 36. From detector 40 the direct current pulse is amplified by direct current amplifier 41, the output of which is applied to ultra high radio frequency transmitter 42 which may be of any suitable type, but preferably of the type that has the grids of its tubes normally biased to stop it from functioning but which is caused to function by the pulse voltages which neutralize the bias voltages. The 15-megacycle pulses received by antenna 15 are thus reradiated in the form of ultra high radio frequency pulses 37, 37' by transmitter 42, shown as coupled to antenna 22 by means of coil 21. The reradiated pulses 37 are received by antenna 10 which is coupled through coils 9 to ultra high radio frequency receiver 34. This receiver comprises an ultra high radio frequency amplifier tuned to transmitter 42, a detector, and a direct current pulse amplifier. The direct current pulse output of amplifier 34 is impressed on vertical deflecting plates 7' of oscillograph 7, which plates 7' are also excited by the pulse modulator 33. Horizontal deflecting plates 4' are connected to the sweep frequency oscillator 35 which is standard oscillograph equipment. The local pulse from 33 produces the reference figure 31 on oscillograph 7 and the reradiated pulse from the mobile object the figure 30. Knowing the traverse speed of sweep frequency oscillator 35 and the distance between figure 31 and 30, the time taken for the pulse to go to the mobile object, pass through it and return to the point of origin, may be found. Knowing the time constant of the apparatus on mobile object 38 and the velocity of propagation of radio waves, the distance to the mobile object may be determined. Thus, if the oscillograph shows that it took 1/500 second for the radio wave to go to the mobile object and return and the time constant of the receiver and transmitter on the mobile object is 1/1000 second, then it took 1/1000 second to traverse the space to the mobile object and back. 1/1000×186,0000=186 miles or 93 miles to the mobile object.

The time constant of the apparatus may be readily determined by determining the spacing of 10—31 along the time axis for a known distance 16—37, calculating the part of the separation of figures 30—31 along the time axis due to the known distance, 36—37, and subtracting that part of the separation from the total separation to determine the part of the separation 30—31 along the time axis due to the constants of the apparatus. Or, if differences of separation of 30—31 or unknown distances 36 are determined with reference to the initial separation of 30—31 for a known distance, as indications of the increments of distance added, then the time contants of the apparatus are directly eliminated and need not be determined.

As described in connection with Figs. 1 and 2, distance indication may also be obtained in the embodiment of Fig. 3, as by providing an additional retransmission receiver similar to receiver 10, 9, 34, at a known distance therefrom, as indicated at 10', 9', 34', in which event this additional receiver may be connected, as shown, for local control at the primary reception station as by means of transmission line 34a and suitable switches 34b, 34c, enabling the output of either or both receivers to be coupled to oscillograph 7. With this arrangement use of the two receivers alternatively, one immediately following the other will determine distances 37 and 37' as described in connection with Fig. 2; or use of the two receivers 34 and 34' concurrently (particularly if the distance separating them is such that the signal from receiver 34' will arrive at the oscillograph in phase with that from receiver 34 when the mobile station 14 is equi-distant from the two receivers, or if one or the other of their outputs is so controlled in phase by a phase shifter like that disclosed in Fig. 2 as to effect this result) will produce two received signal humps 30 in the figure of oscillograph 7 (as described in connection with Fig. 4) the spacing between which will then correspond to the distance 37'. These distance determinations, with the known separation of stations 34 and 34' will then determine the location of mobile station 38, as described in connection with mobile station 14 shown in Fig. 2.

Knowing the distances to a mobile object of known altitude from two geographically separated points, the geographic location of the mobile object is known. Thus, if, instead of providing a second receiving installation only (as indicated at 4'' in Fig. 1, at 8a in Fig. 2, and at 34a in Fig. 3) a complete apparatus such as is otherwise shown in Fig. 1, 2 or 3, is located at two or more points, the position of a mobile object may also be found, by coordinating the two independent distance records to the same time axis.

In Fig. 4 is shown a combination in which the position of a mobile object may be found with receiving and transmitting apparatus all located at a single location. In this instance the transmitting and receiving equipment at the ground station, and the equipment on the mobile object may be the same as that shown in Fig. 3 and may be operated in the same manner to determine the distance to the mobile object. Directional receiving equipment is however added or substituted so that the azimuthal location of the mobile object may be found. An important novel aspect of this equipment is that it eliminates the errors in bearings due to spurious reflected, refracted and diffracted waves which may come over indirect paths from the mobile object. With this type of direction finder the bearing is taken only on the wave that reaches the receiving point first which gives the true bearing as it has traveled over the straight path. In Fig. 4, there is represented a conventional form of direction finder with vertical doublets 45, 46, and 47 arranged in the manner of a Yagi array, rotatable about a vertical axis by means of shaft 48, with pointer 53 and scale 52. Doublet 46 is connected to slip rings 50, 50' by means of transmission lines 49, 49'.

Brushes 51, 51' connect the slip rings to ultra high radio frequency receiver 44 which is similar to and may be used together with or in lieu of receiver 34, as indicated by switches 44a and 34a. The output of the directional receiver 44 is applied (together with or in lieu of the output of non-directional receiver 34) to one set, as the vertical set, of deflecting plates of the oscillograph to be employed, two oscillographs 7 and 54, having deflecting plates 7' and 55 respectively, and operable with different sweep speeds, being shown in this connection. When the outputs of both receivers are to be applied to the oscillograph or oscillographs so that the oscillograph figures will have a certain observable amplitude at all times, at least one of the receivers is preferably provided with an adjustable time-lag device as 44b, which may be of the well known resistance-capacity network type, to enable adjustment of the two outputs to synchronism with one another. To provide the reference hump, in the form shown, the output of the local pulse generator 33 is also connected to the vertical deflecting plates of the oscillograph or oscillographs being used, 7' and 55 in the form shown. The other set of oscillograph plates (11' and 56 herein) of the oscillograph being used is connected to the oscillograph sweep frequency generator. Two such generators are shown in the illustrative embodiment; a high-speed generator 35 to produce the more attenuated figure 30—31 of oscillograph 7, and a slower speed generator 60 to produce the more comprehensive figure 57, 58, 59 of oscillograph 54. In the form shown both sweep frequency generators are of the type triggered to commence the sweep by pulse frequency generator 33 as indicated by the connections 33a, to start the traverse concurrently with the start of the pulse of pulse generator 33 producing figure 31 and 59.

When this system is operating the local pulse produces figure 59 (and figure 31) and the direct one from the mobile object travelling over path 61 produces figure 58 (and figure 30). The indirect pulse 63 reflected from cloud layer or humidity front 62 produces the figure 57 which arrives somewhat later than the directly transmitted pulse 61. In operation the direction finder is oriented until the pulse producing figure 58 (the one travelling over the shortest route) produces a maximum (or minimum) deflection in figure 58. When this point is found the azimuthal bearing is read opposite pointer 53 on scale 52. It is understood that any conventional form of direction finder suitable for taking azimuthal bearings on ultra-high radio frequencies may be used in the place of the one shown with its output connected to the visual pulse indicator as shown. Knowing the azimuthal bearing to the mobile object, and the distance to it, its geographical location is known.

The employment of two oscillographs, as 7 and 54, renders it possible to conduct adjustment of one, to change its horizontal scale, while continuing readings on the other, it being desirable to maintain the horizontal scale of one oscillograph to widely separate the humps, as 30 and 31, to facilitate accurate determination of the time lag, but to have the other adjusted with the humps more closely spaced, as 59, 58, 57, so that when hump 30 moves out of the frame, due say to increase of distance to the mobile object, corresponding hump 58 will remain on oscillograph 55, and be continuously observable, during change of the sweep-speed of oscillograph 7, and vice-versa. If, however, this advantage is not desired, it will be appreciated that one of the oscillographs and its sweep-frequency generator may be omitted without departing from the broader aspects of this invention.

Similarly, it is desirable than non-directional receiver 34 be available in addition to directional receiver 44, so that a continuous check on distance may be had, undisturbed by loss of signal on reorientation of the directional receiving antenna 45, 46, 47. This may be done either by closing the switch 34a if and when the directionally received signal is lost, or by keeping the switch 34a closed to always assure a minimum amplitude of humps in the oscillograph figures, in which case the outputs of the two receivers should be phased, as by the means 44b described. The switch 44a is of course kept closed whenever directional reception is desired, and it will be apparent that if the advantage of the availability of two receivers, or the equivalent thereof, is not desired, receiver 34 may be omitted and the distance and direction indications may both be obtained from receiver 44, care being taken to not lose the signal by excessive manipulation of antenna 45, 46, 47.

From the above description it is obvious that the invention is not limited to the particular embodiments described and the subject matter of the invention as set forth in the following claims, is to be interpreted accordingly.

I claim:

1. A method for determining direction and distance between two relatively ambulant stations which comprises transmitting a signal from one of said stations as a station of origin, intercepting and retransmitting the signal at the other of said stations as a repeater station, and receiving the repeated signal by directional reception at said station of origin where the portion of said signal travelling a direct path will be received ahead of the portion thereof travelling an indirect path, establishing the elapsed time between transmission of the original signal and first reception of the retransmitted signal for a known distance separation of the station of origin and the repeater station, determining changes in said elapsed time with relative change in position of said stations, and determining the azimuthal direction of directional reception of the first received retransmitted signal, thereby determining changes of distance separation of the two stations and the azimuthal direction of one relative to the other as indicated by the signal travelling the most direct path between the two stations.

2. A method for determining direction and distance between two relatively ambulant stations which comprises transmitting a signal from one of said stations as a station of origin, intercepting and retransmitting the signal at the other of said stations as a repeater station, and receiving the repeated signal by directional and non-directional reception at said station of origin, where the portion of said signal travelling a direct path will be received ahead of the portion travelling an indirect path, adding the directionally and non-directionally received portions of the signal in phased relation to produce a resultant, establishing the elapsed time between transmission of the original signal and first reception of the retransmitted signal for a known distance separation of the station of origin and the repeater station, determining changes in said elapsed time with relative change in position of said stations, and determining the azimuthal direction of directional reception of the first directionally received retransmitted signal, thereby determining changes of distance separation of the two stations and the azimuthal direction of one relative to the other as indicated by the signal travelling the most direct path between the two stations, and providing for continuity of distance observations throughout the making of observations to determine direction.

3. In a radio system of distance finding, a pair of relatively ambulant stations; one of said stations comprising a radio transmitter, a modulator therefor, and oscillograph means excited by a single phase derived from the output of said modulator; the other of said stations comprising means for receiving the modulated signal transmitted from said first station and for detecting and amplifying the modulation thereof and a second radio transmitter modulated by said amplified modulation; said transmitters being receivably segregable; said first station further comprising a radio receiver for receiving the signal transmitted from said second station, means for detecting the retransmitted modulation thereof, and means for exciting said oscillograph by a single phase derived from the said retransmitted modulation; and said first station including means associated with said oscillograph for determining the time phase relation between the two excitations, whereby radial distance between said two stations and functions thereof may be determined, said oscillograph having two sets of deflecting means excited, respectively, by said modulator and said retransmitted modulation, and said time-phase determining means comprising and adjustable phase shifter associated with at least one of said oscillograph exciting means.

4. In a radio system of distance finding, a pair of relatively ambulant stations; one of said stations comprising a radio transmitter, a modulator therefor, and oscillograph means excited by a single phase derived from the output of said modulator; the other of said stations comprising means for receiving the modulated signal transmitted from said first station and for detecting and amplifying the modulation thereof and a second radio transmitter modulated by said amplified modulation; said transmitters being receivably segregable; said first station further comprising a radio receiver for receiving the signal transmitted from said second station, means for detecting the retransmitted modulation thereof, and means for exciting said oscillograph by a single phase derived from the said retransmitted modulation; and said first station including means associated with said oscillograph for determining the time phase relation between the two excitations, whereby radial distance between said two stations and functions thereof may be determined, said oscillograph having two pairs of deflecting means, one of said pairs excited by said modulator and said retransmitted modulation, and said means for determining the time-phase relation comprising a sweep-frequency oscillator exciting the other of said pairs of deflecting means.

5. In a radio system of distance finding, a pair of relatively ambulant stations; one of said stations comprising a radio transmitter, a modulator therefor, and oscillograph means excited by said modulator; the other of said stations comprising means for receiving the modulated signal transmitted from said first station and for detecting and amplifying the modulation thereof and a second radio transmitter modulated by said amplified modulation; said transmitters being receivably segregable; said first station further comprising a radio receiver for receiving the signal transmitted from said second station, means for detecting the retransmitted modulation thereof, and means for exciting said oscillograph by said retransmitted modulation; said first station including means associated with said oscillograph for determining the time-phase relation between the two excitations, whereby radial distance between said two stations and functions thereof may be determined; and said system including means, responsive to said second transmitter, for determining the relative azimuthal position of said stations, said last named means comprising direction finding means responsive to signals from said second transmitter, and means associated therewith for distinguishing between signals travelling by the most direct path to and from said second station, and signals travelling between said stations in the trace of an indirect path.

6. In a radio system of distance finding, a station of origin comprising a radio transmitter, means modulating said transmitter, and an oscillograph means including a phase shifting means and having a first set of deflecting elements excited by said modulating means through said phase-shifting means; a repeater station comprising means for receiving the modulated carrier wave from said transmitter and means for detecting and amplifying the modulation, and further comprising a second radio transmitter operating on a different carrier frequency from that of said first transmitter, and means for impressing the detected and amplified modulation on said second radio transmitter; said station of origin further comprising a receiving means tuned to the carrier frequency of said repeater station transmitter, having detecting and amplifying means for said modulation frequency, and having its output connected to a second set of deflecting elements of said oscillograph, whereby a fixed Lissajous figure may be formed in the said oscillograph by adjusting said phase shifting means, enabling shift of phase of the modulation signal during its travel from the station of origin to and from the repeater station to be determined.

7. In a radio system of distance finding, a station of origin comprising a radio transmitter, means modulating said transmitter, and an oscillograph means including a phase shifter means and an electronic switch and having a first set of deflecting elements excited by said modulating means and a second set of deflecting elements excited by said modulating means through said electronic switch; a repeater station comprising means for receiving the modulated carrier wave from said transmitter and means for detecting and amplifying the modulation thereof, and further comprising a second radio transmitter operating on a different carrier frequency from that of said first transmitter and means for impressing the detected and amplified modulation on said second transmitter; said station of origin further comprising a receiving means tuned to the carrier frequency of said repeater station transmitter, having detecting and amplifying means for said modulation frequency, and having its output passed through said phase shifting means and said electronic switch to the said second set of deflecting elements of said oscillograph, whereby two Lissajous figures are formed in said oscillograph and may be held in a fixed relation by adjusting said phase shifter, substantially as and for the purpose described.

8. The combination set forth in claim 7, further comprising a second receiving means tuned to the carrier frequency of said repeater transmitter and located remotely with respect to the receiving means at the station of origin, said second receiving means having detecting and amplifying means for said modulation frequency and having it output connectable by a transmission line and said electronic switch to said second set of deflecting elements of said oscillograph, said transmission line comprising phase shifting means; whereby a third Lissajous figure is formed in said oscillograph thus determining a second radial distance establishing the geographic location of said repeater station.

9. In a radio system of distance finding, a station of origin comprising a radio transmitter, means for pulse modulating said transmitter, and an oscillograph means having a first set of deflecting elements excited by said pulse modulating means; a repeater station comprising means for receiving the pulse modulated carrier wave from said transmitter, means for detecting and amplifying the pulse modulation, a second radio transmitter operating on a different carrier frequency from that of said first transmitter and responsive to, and caused to function during the interval of each pulse of, said pulse modulation; said station of origin comprising a receiving means tuned to the carrier frequency of said second transmitter, having detecting and amplifying means for said pulse modulation and having its output connected to said first set of deflecting means of said oscillograph, a sweep frequency oscillator and a second set of deflecting means in said oscillograph excited by said sweep frequency oscillator, whereby two figures are formed in the trace of said oscillograph from which the radial distance to the said repeater station may be determined, direction finding means for said second transmitting means, receiving means associated with said direction finding means, a second oscillograph having a first set of deflecting elements connected to the output of said last named receiving means and connected to be excited by said pulse modulating means, a second sweep frequency oscillator, and said second oscillograph having a second set of deflecting elements excited by said second sweep frequency oscillator, whereby by operating the said direction finder and observing the reference and next adjacent figure in the trace of the oscillograph until the latter becomes either a maximum or minimum in size, the true azimuthal bearing of said second transmitting means may be determined and whereby each oscillograph may be changed in adjustment while continuing observations on the other.

10. In a radio system of distance finding, a station of origin comprising a radio transmitter, means for pulse modulating said transmitter, and an oscillograph means having a first set of deflecting elements excited by said pulse modulating means; a repeater station comprising means for receiving the pulse modulated carrier wave from said transmitter, means for detecting and amplifying the pulse modulation, a second radio transmitter operating on a different carrier frequency from that of said first transmitter and responsive to, and caused to function during the interval of each pulse of, said pulse modulation; said station of origin comprising a receiving means tuned to the carrier frequency of said second transmitter, having detecting and amplifying means for said pulse modulation and having its output connected to said first set of deflecting means of said oscillograph, a sweep frequency oscillator and a second set of deflecting means in said oscillograph excited by said sweep frequency oscillator, whereby two figures are formed in the trace of said oscillograph from which the radial distance to the said repeater station may be determined, a second sweep-frequency oscillator and a second sweep frequency oscillograph, said second oscillograph having a first set of deflecting elements connected in parallel with the first set of deflecting elements of said first oscillograph, and having a second set of deflecting elements excited by said second sweep frequency oscillator, whereby the sweep frequency rate of each oscillograph may be adjusted while continuing observations with the other.

11. In a radio system of distance finding, a station of origin comprising a radio transmitter, means for pulse modulating said transmitter, and an oscillograph means having a first set of deflecting elements excited by said pulse modulating means; a repeater station comprising means for receiving the pulse modulated carrier wave from said transmitter, means for detecting and amplifying the pulse modulation, a second radio transmitter operating on a different carrier frequency from that of said first transmitter and responsive to, and caused to function during the interval of each pulse of, said pulse modulations; said station of origin comprising a receiving means tuned to the carrier frequency of said second transmitter, having detecting and amplifying means for said pulse modulation and having its output connected to said first set of deflecting means of said oscillograph, a sweep frequency oscillator and a second set of deflecting means in said oscillograph excited by said sweep frequency oscillator, whereby two figures are formed in the trace of said oscillograph from which the radial distance to the said repeater station may be determined, the receiving means at said station of origin comprising direction finding means, whereby by operating the said direction finding means and observing the reference and next adjacent figure in the trace of the oscillograph until the latter becomes either a maximum or minimum in size, the true azimuthal bearing of said second transmitting means may be determined.

12. A method for determining the direction from one station to another station, said stations being relatively ambulant, which comprises transmitting at least one radio pulse from said one station, intercepting and retransmitting said pulse at said other station as a repeater station, receiving by directional means said retransmitted pulse at said one station where the portion of said pulse traveling a direct path will be received ahead of the portion traveling an indirect path, determining the azimuthal direction of directional reception of the first received retransmitted signal thereby determining the azimuthal direction of the said other station as indicated by the signal traveling the most direct path between the two stations.

13. In a position finding system, a station including a transmitter of radiant energy, pulse modulation means causing said transmitter to radiate a series of short outgoing pulses, directional receiving means rotatable about at least one axis for receiving incoming pulses, said incoming pulses being produced by the interception by an object of said outgoing pulses, indicating means having deflecting means in each of two coordinates, means for impressing indications of said outgoing pulses and said incoming pulses on one of said deflecting means, and means for impressing a time base on the other of said deflecting means, whereby the direction to said object can be determined by said directional means and the distance to said object can be determined by said indicating means, a second indicating means having deflecting means in two coordinates, means for impressing said outgoing and said incoming pulses on one of said deflecting means of said second indicating means, and means for impressing a second time base on said other deflecting means of said second indicating means, whereby the indication of one indicating means is expanded with respect to the indication of the other indicating means.

FRANCIS W. DUNMORE.

REFERENCES CITED

The following references are of record in the file of this patent:

UNITED STATES PATENTS

| Number | Name | Date |
|---|---|---|
| 1,750,668 | Green | Mar. 18, 1930 |
| 1,924,156 | Hart | Aug. 29, 1933 |
| 2,012,480 | Reich | Aug. 27, 1935 |
| 2,059,315 | Chireix | Nov. 3, 1936 |
| 2,134,716 | Gunn | Nov. 1, 1938 |
| 2,143,035 | Smith | Jan. 10, 1939 |
| 2,150,857 | Edwards | Mar. 14, 1939 |
| 2,151,917 | Hyland | Mar. 28, 1939 |
| 2,189,549 | Hershberger | Feb. 6, 1940 |
| 2,423,023 | Hershberger | June 24, 1947 |

FOREIGN PATENTS

| Number | Country | Date |
|---|---|---|
| 784,425 | France | July 22, 1935 |

OTHER REFERENCES

Signal Corps Affidavit on "110 MC Plane Detection and Position Finding System," May 1937.